United States Patent [19]
Vollmer et al.

[11] Patent Number: 5,718,486
[45] Date of Patent: Feb. 17, 1998

[54] ELECTROPNEUMATIC BRAKES SYSTEM FOR MOTOR VEHICLES

[75] Inventors: Otto Vollmer; Ansgar Fries, both of Munich, Germany

[73] Assignee: Knorr-Bremse Systeme fur Nutzfahrzeuge GmbH, Munich, Germany

[21] Appl. No.: 663,194
[22] PCT Filed: Jun. 22, 1994
[86] PCT No.: PCT/DE94/00712
§ 371 Date: Jun. 11, 1996
§ 102(e) Date: Jun. 11, 1996
[87] PCT Pub. No.: WO95/16594
PCT Pub. Date: Jun. 22, 1995

[30] Foreign Application Priority Data

Dec. 17, 1993 [DE] Germany ............ 43 43 215.8

[51] Int. Cl.$^6$ ............................................. B60T 13/68
[52] U.S. Cl. ............................................. 303/3; 303/15
[58] Field of Search ................. 303/3, 7, 9.66, 303/13–15, 123, 20, DIG. 6

[56] References Cited

U.S. PATENT DOCUMENTS

| | | | |
|---|---|---|---|
| 4,861,115 | 8/1989 | Petersen | 303/15 |
| 5,294,190 | 3/1994 | Feldmann et al. | 303/3 |
| 5,302,008 | 4/1994 | Miyake et al. | 303/14 |
| 5,549,362 | 8/1996 | Broome | 303/3 |

*Primary Examiner*—Josie Ballato
*Attorney, Agent, or Firm*—Barnes & Thornburg

[57] ABSTRACT

In the case of an electropneumatic brake system for motor vehicles, a pedal-operated braking power generator is provided which acts electrically upon an electronic control unit and feeds pneumatically into a pressure modulator which includes a proportional valve device and a reversing valve device. The pressure modulator is also controlled by desired electric value signals of the electronic control unit and is used for activating a valve device which modulates pressure mediums for the brake operation of the brake system. When the electric control fails, the pressure modulator operates redundantly.

11 Claims, 5 Drawing Sheets

ELECTROPNEUMATIC BRAKES SYSTEM FOR MOTOR VEHICLES

BACKGROUND AND SUMMARY OF THE INVENTION

The invention relates to an electropneumatic brake system in general and more specifically to a pedal-operated electropneumatic brake system.

Pressure medium brake systems which are influenced electrically as well as pneumatically are known (European Patent Document EP-A-0478953), are included one relay valve respectively for admitting pressure to the brake cylinders of the front and the rear axle. Such relay valves have a pressure medium control and an electric control, each electric control being equipped with a solenoid valve. One pressure control device respectively is arranged between the solenoid valve and the relay valve. By such a development of the relay valves, an electric as well as a pneumatic control is made possible.

In the course of the increasing completion of electronically influenced brake systems of motor vehicles, it is required to use electrically as well as pneumatically controlling braking power generators which act at least on the braking system of the rear axle by a redundancy action if the electric control fails. In the case of a conventionally pneumatic braking at the front axle, selectively, an electric or pneumatic control at the rear axle and the linking with electronic components of the brake system is permitted.

It is an object of the invention to develop an electropneumatic brake system of the concerned type such that, while the constructional expenditures are low, the system meets the above-mentioned requirements. These and other objects are achieved by a pressure modulator, which can preferably be used on the brake system of the vehicle rear axle and/or the trailer control valve of a towing vehicle. Electrical as well as a pneumatic control of the relay valve or of the trailer control valve is ensured by a safety of the pneumatic fall-back plane of the pressure modulator. The operating principle of the pressure modulator formed of a proportional valve and a reversing valve can be used on brake systems with a braking power generator which have one pneumatic and one electric or which have two pneumatic and one electric brake circuit or several control circuits of this type. In this case, the pedal-operated braking power generator in the form of a foot brake pedal emits a desired electric to the electronic control unit of the brake system for a further processing, the control unit controlling the individual actuators of the system. Electric signals of a plurality of sensors may be provided to the electronic control unit, which sensors, on the whole, may include the sensors of an EBS-or antilock system and, in their totality, contribute to the control of a desired electric value for the pressure modulator. When a load sensor is used for feeding load signals into the electronic control unit, conventional load-dependent braking power controllers will not be required. If the signals of a coupling force sensor are used between a towing vehicle and a trailer, it is possible to influence the brake system of the trailer corresponding to the coupling force change.

The redundancy action of the pressure modulators is ensured in a constructionally very simple manner, specifically by the linking of the proportional valve with the reversing valve which can be controlled pneumatically as well as electromagnetically and, in the case of a failure of the electric control, will control pneumatically, whether in an assignment to a relay valve for the brake cylinders of the rear axle or in an assignment to a trailer control valve for the trailer of a vehicle which is preferably designed in a dual-circuit manner.

Advantageous developments and further developments are indicated in additional claims.

In the following, the invention will be explained by means of embodiments with reference to the attached drawing.

DETAILED DESCRIPTION OF THE PREFERRED EMBODIMENTS

Figure 1:
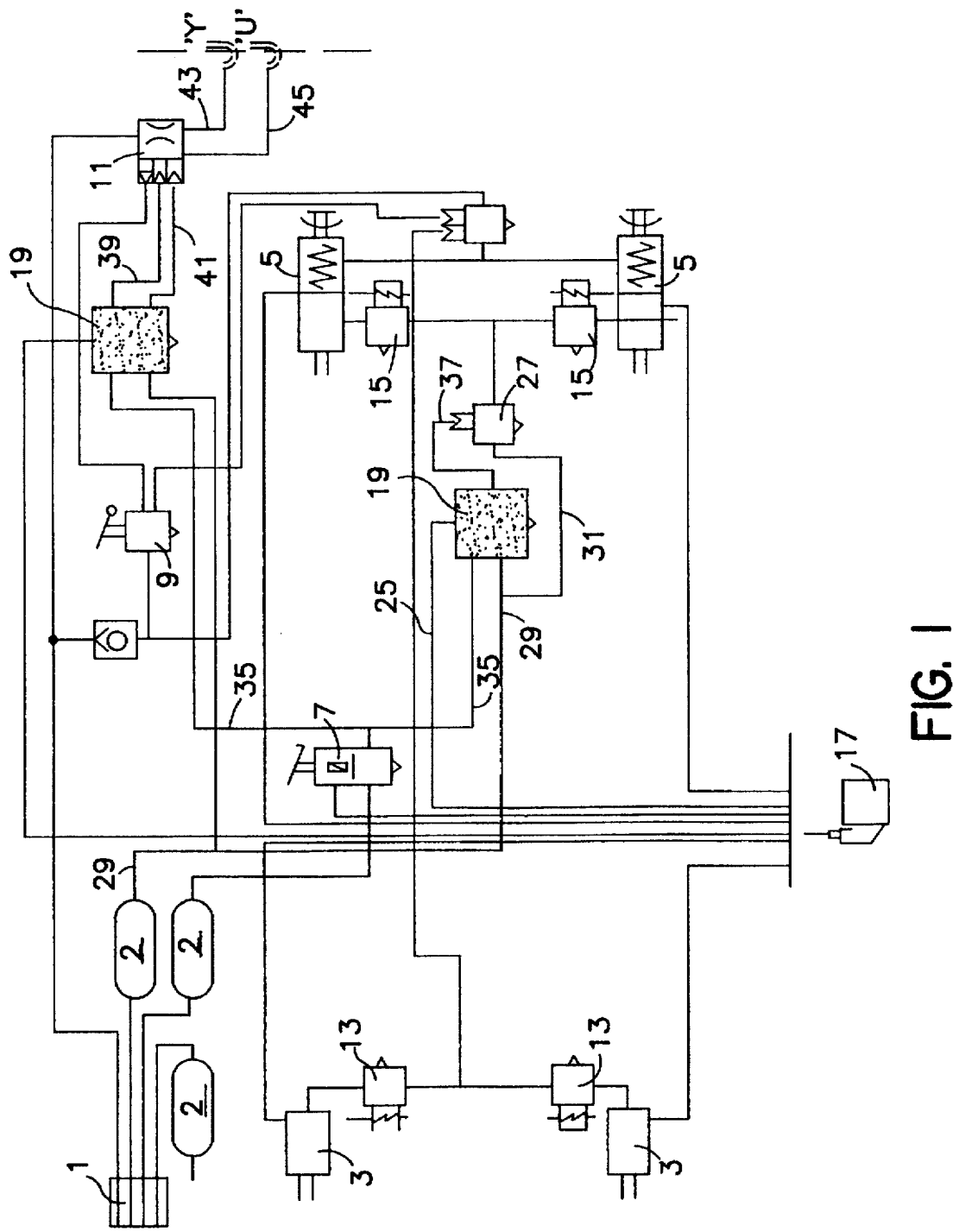
FIG. 1 is a schematic view of an electropneumatic brake system of the invention according to a first embodiment of the invention.

An electropneumatic brake system according to the invention illustrated in FIG. 1 contains, in a conventional manner, a multiple-circuit protection valve 1, compressed-air storage containers 2, brake cylinders 3 of the front axle; brake cylinders 5 of the rear axle which are constructed as combined service brake cylinders and spring-loaded brake cylinders, a braking power generator 7 in the form of a foot brake valve, a hand brake valve 9, a trailer control valve 11, pressure control valves 13 and 15 for the front and the rear axle and an electronic control unit 17. One electropneumatic pressure modulator 19 respectively operating as follows, according to the invention, is assigned to the brake cylinders of the rear axle and/or to the trailer control valve.

Figure 2:
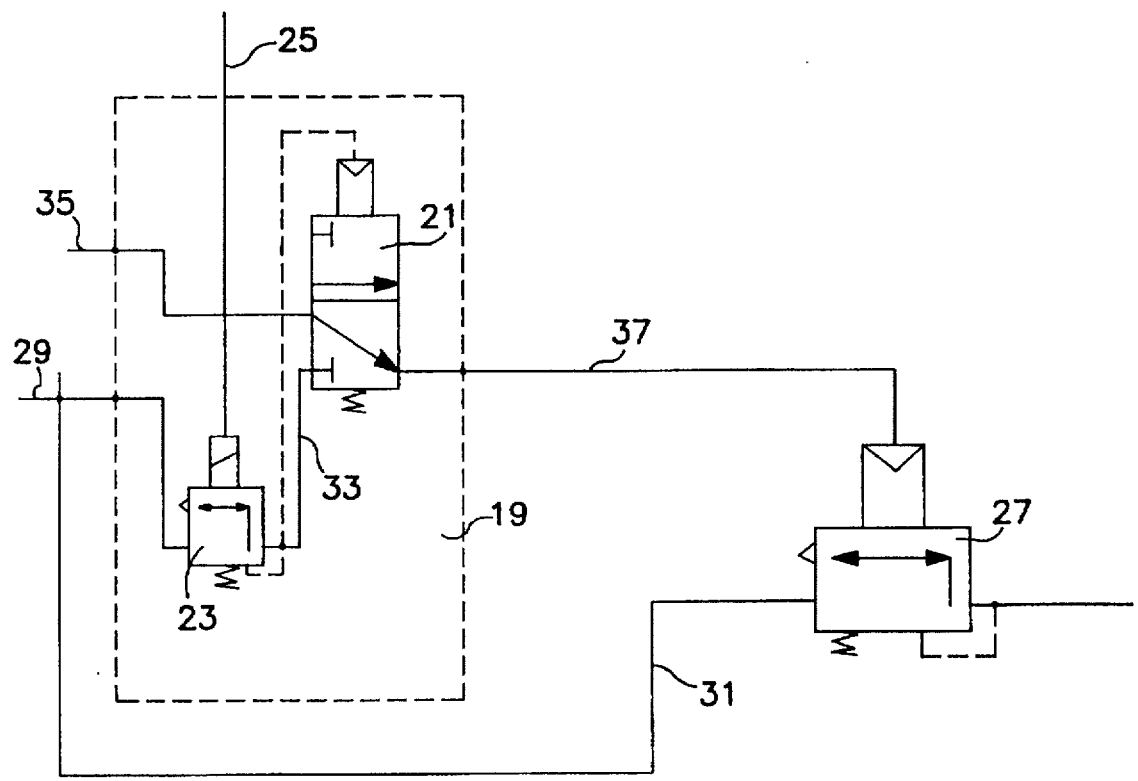
FIG. 2 is a schematic individual of a pressure modulator used in the system according to FIG. 1 for a relay valve for the brake system of the rear axle.

According to FIG. 2, the pressure modulator 19 used in the enclosure according to FIG. 1 includes a reversing valve 21 and a proportional valve 23. The proportional valve 23 operates conventionally by a proportional magnet which, while being controlled by the electronic control unit 17, can be excited by the electric line 25. While being controlled by the proportional magnet, the proportional valve 23 proportions a proportional pneumatic output pressure which will operate as a control pressure on the relay valve 27 (FIG. 1 and 2) arranged behind the pressure modulator 19. In the embodiment according to FIG. 2, supply pressure is applied to the line 29 and to line 31 branching off line 29. The proportional pressure controlled by the proportional valve 23 is provided, by line 33 to the reversing valve 21 and may be transmitted by it by line 37, to the relay valve 27 or its control piston. The reversing valve 21 acts as a redundancy valve in that, when there is no desired electric value, by way of a pressure signal (pneumatic fall-back plane) existing at the reversing valve 21 by way of line 35, a corresponding proportional pressure is controlled by way of line 37 for the purpose of acting upon the relay valve 27. This operating position is symbolically indicated in FIG. 2. According to FIG. 1, the brake system of the rear axle is fed by a conventional relay valve 27 which, in the manner explained above, can be controlled by the electropneumatic pressure modulator 19. This control is based on the actuating by the braking power generator 7 which has at least one pneumatic and one electric circuit. FIG. 2 shows the reversing valve in the redundancy position in which a free passage exists from line 35 into line 37 and therefore to the relay valve 27. The proportional valve 23, which is not excited in this case, is inoperative.

Figure 3:
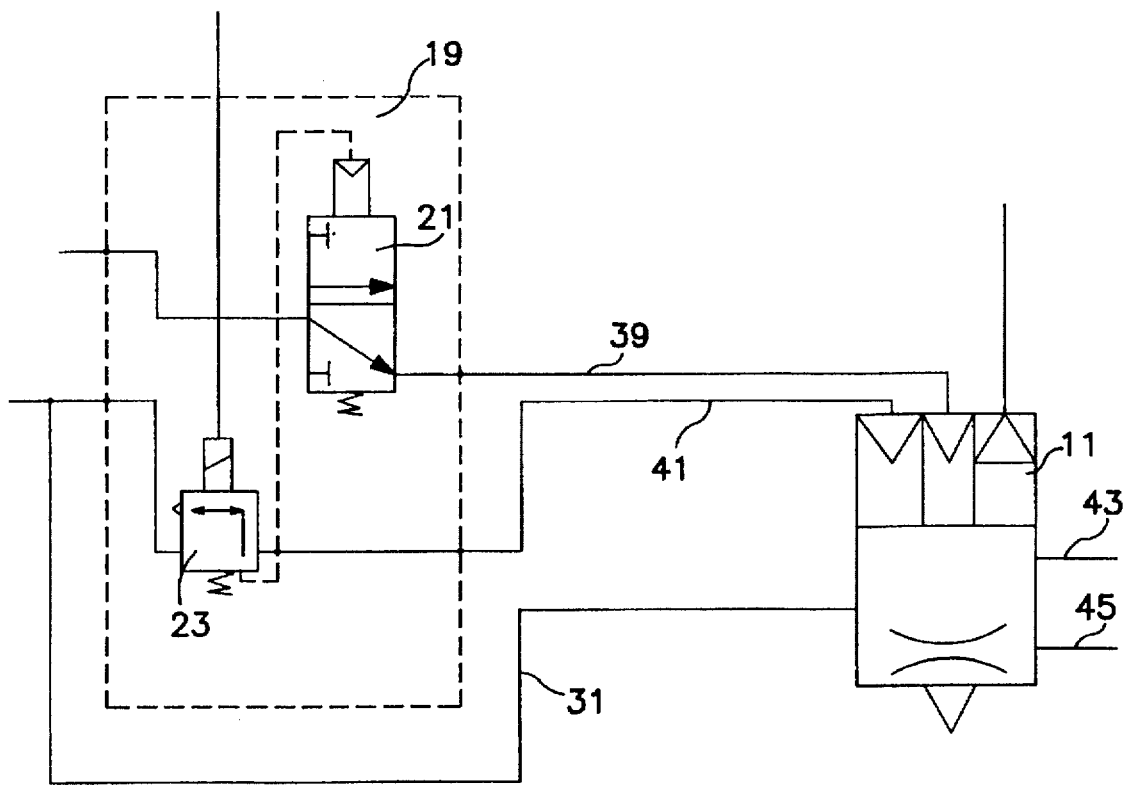
FIG. 3 is a schematic of the pressure modulator which can be compared with FIG. 2, for a trailer control valve.

FIG. 3 illustrates the electropneumatic pressure modulator 19 for the trailer control valve 11 shown in the upper half of FIG. 1. Lines 39 and 41 lead from the reversing valve 21 and the proportional valve 23 to the pertaining connections of the trailer control valve 11 which are known per se. From trailer 11, control valve the lines 43 and 45 for the supply and brake pressure branch off lead to the coupling heads. As illustrated by a comparison between FIGS. 2 and 3, the internal wiring of the pressure modulator 19 according to FIG. 3 differs from that according to FIG. 2; that is, the line 41 according to FIG. 3 is connected directly to the trailer control valve 11. There is therefore no through-control from the proportional valve 23 in the manner illustrated in FIG. 2. When the excitation of the proportional magnet of the proportional valve 23 fails, the pressure originating from the front axle brake circuit is applied by line 39 to the trailer control valve 11. Line 41 remains without pressure. In a manner known per se, the trailer control valve 11 is constructed as a dual-circuit control valve; to this extent, the unpressurized line 41 remains without any effect on the function of the trailer control valve 11.

Figure 4:
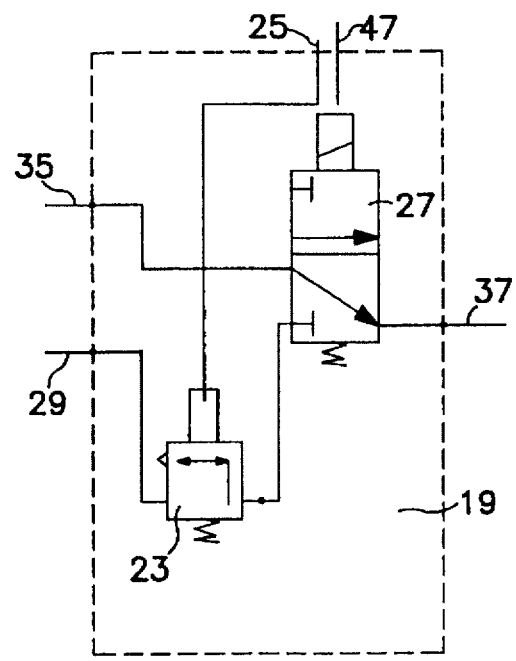
FIG. 4 is a schematic of the pressure modulator provided for the use according to FIG. 2 with an electric control of the proportional valve as well as of the reversing valve.
Figure 5:
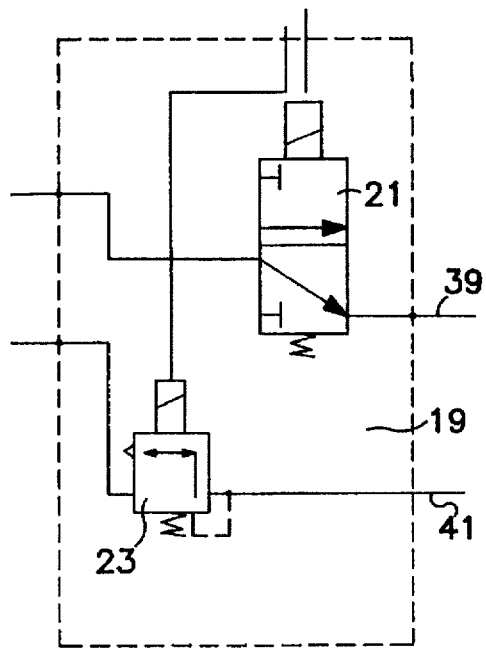
FIG. 5 is a schematic of the pressure modulator of the use illustrated in FIG. 3 with an electric control of the proportional valve as well as of the reversing valve.

FIGS. 4 and 5 show other advantageous embodiments of the pressure modulator corresponding to FIGS. 2 and 3. According to FIG. 4, the reversing valve 21 is constructed as a solenoid valve and can be controlled by the electronic control line 47 from the electric control unit 17. The proportional valve 23 can be controlled in the manner explained by referring to FIG. 2 by the electric control line 25. When the magnet of the reversing valve 21 is excited, the connection between the proportional valve 23 and line 37 is opened up. Corresponding to the electromagnetic actuating of the proportional valve 23, the control of the relay valve 27 takes place by the proportional valve 23 which receives compressed air from line 29. When the electric control of the reversing valve 21 fails, the connection between the proportional valve 23 and the relay valve 27 is blocked under the effect of a spring in such a manner that the through-control illustrated in FIG. 4 takes place from line 35 to line 37.

The corresponding method of operation is provided in the embodiment according to FIG. 5, with the difference of the type explained with reference to FIG. 3; that is, that the trailer control valve 11 is controlled in a dual-circuit manner by way of lines 39 and 41.

Figure 6:
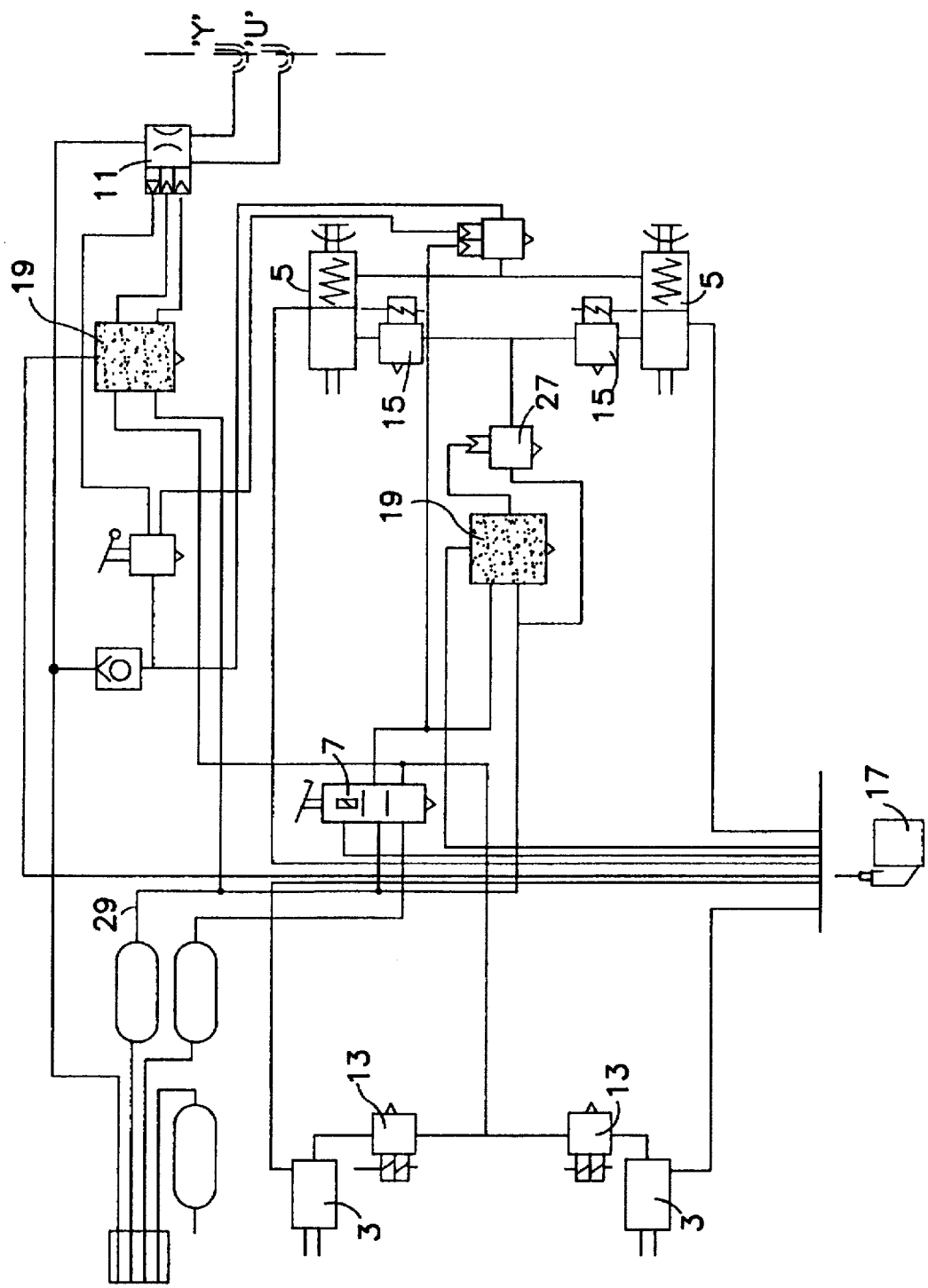
FIGS. 6 and 7 are schematics of the brake system according to further embodiments of the invention.

FIG. 6 illustrates an electropneumatic brake system wherein the braking power generator 7 modulates pneumatically in a dual-circuit manner in addition to the one electrical manner. The front axle brake circuit, in a conventional manner, is fed directly by line 29 carrying compressed air, whereas the rear axle brake circuit and/or the trailer control valve are fed using pressure modulators of the above-explained construction and method of operation. As in the case of the embodiment according to FIG. 1 to 5, according to the invention, the pressure modulators 19 are provided in order to convert a desired electric value of the electronic control unit 17 into a proportional output pressure. In the same manner, it is ensured that, in the case of a non-existing desired electric value, by way of the pneumatic fall-back plane (FIGS. 2 to 5), a corresponding proportional pressure is modulated. In the case of the illustrated brake system according to FIG. 6, which is equipped with two pneumatic circuits from the braking power generator 7, the control of the dual-circuit trailer control valve 11 is also possible in a conventional manner; that is, there may not have to be any pressure modulator 19 for the trailer control valve 11.

Figure 7:
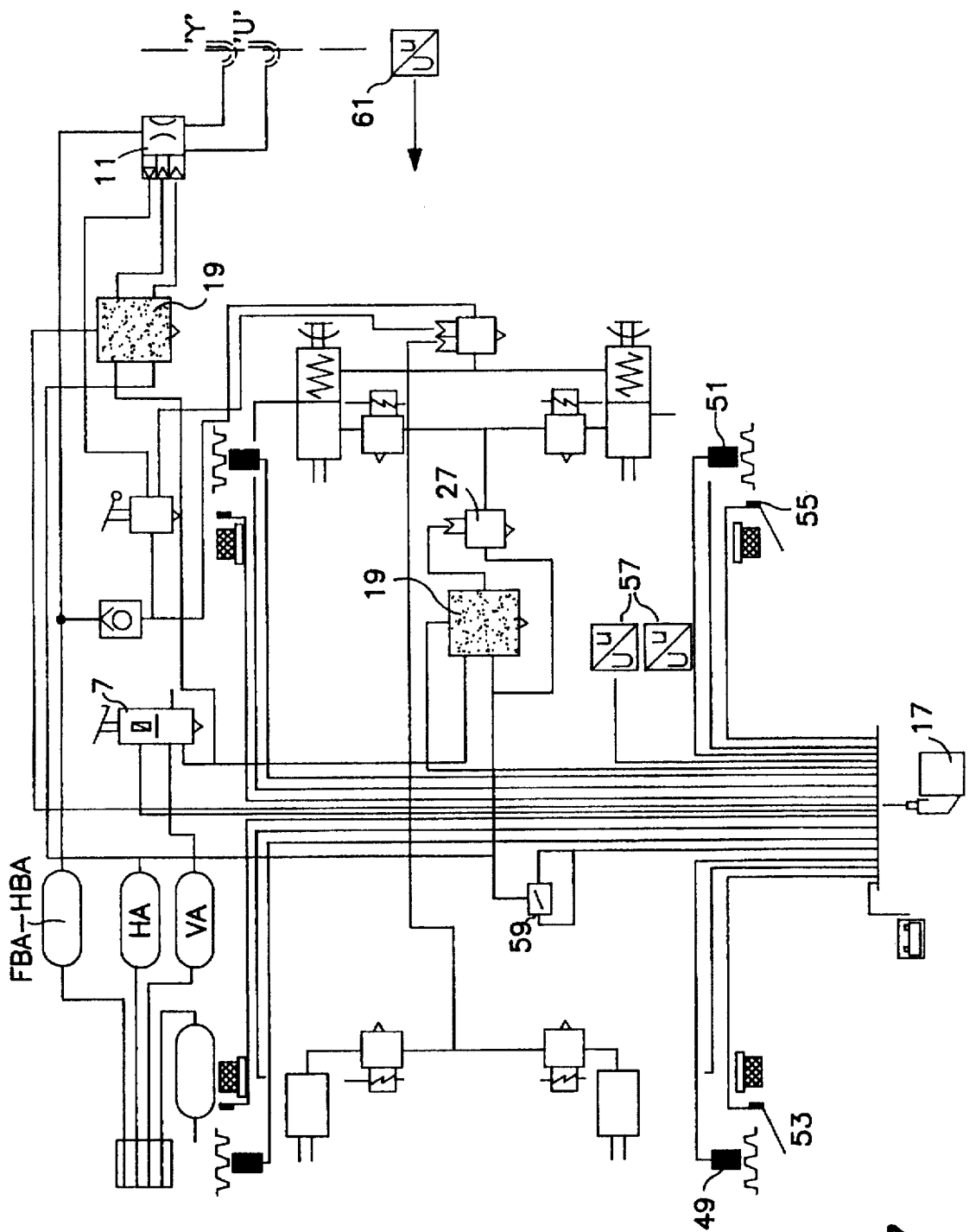

The embodiment according to FIG. 7 illustrates the multiple manner in which information can be collected for the electronic control unit 17 and, after the evaluation, are processed by it for controlling the pressure modulators 19. Rotational speed sensors 49 and 51 are provided on the front axle and on the rear axle. Also provided are wear sensors 53 and 55 for the brake linings of the brakes on the front and rear axle, a load sensor 57, a pressure switch 59 and a coupling force sensor 61. By way of the illustrated command lines, the measured values of the individual sensors are provided to the electronic control unit 17, are processed there and are, in turn, modulated by way of the electropneumatic pressure modulators 19 in the form of proportional pneumatic quantities. Thus, in a comparison of the measured values of the wear sensors 53 and 55 of the front and rear axle, an optimization of the lining wear is possible by [means of]the pressure modulator 19 acting upon the brake cylinders of the rear axle, with the goal of achieving an evening-out on the friction linings of the brakes.

From the load sensor 57, measuring signals are provided to the pressure control unit 17 and are, in turn, converted by it into a desired electric value for the pressure modulator 19. In the case of electropneumatic brake systems of the type illustrated in FIG. 7, conventional braking power controllers with all variants will therefore not be necessary. In a comparable method of operation, the coupling force sensor 61 provides a measured value of coupling force to the control unit 17 and is subsequently used for a proportional control of the trailer control valve 11 and therefore for influencing the braking operation of the trailer.

When used for controlling the brake cylinders on the rear or power axle, the providing of compressed air in the case of a wheel slip control operation also takes place by an electropneumatic pressure modulator. In this case, the wheel slip control differential brake valves with the pertaining change-over valves, which normally exist on the power axle, will be absent. Since, in this case, the compressed air is consumed by the service brake circuit, the pressure switch 59 (FIG. 7) is provided in front of the pressure modulator 19. When the pressure falls below a fixed pressure, the pressure switch 59 will switch so that the electronic control unit 17 will discontinue the wheel slip control operation. In this manner, it is always ensured that, in the case of a subsequent braking, sufficient air will be in the container (HA container according to FIG. 7).

Within the scope of the idea of the invention, the components of the pressure modulator may have a different design while the functional purpose is maintained. Thus, the proportional valve may have a proportional magnet with a corresponding valve part, but it may also be designed as a quick-acting two-step magnetic valve.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Electropneumatic brake system for motor vehicles, having a pedal-operated braking power generator for control of a valve device which modulates pressure mediums for the brake operation further comprising:

a) the braking power generator operating at least one electric control circuit and at least one pressure medium circuit, b) an electronic control unit receiving an electric signal from the braking power generator and generating electrical control signals, c) a pressure modulator in the pressure medium circuit with the valve device, the pressure modulator converts the electrical control signals from the electronic control unit into a proportional output pressure for controlling the valve device and, when there is no electrical control signal, provides a corresponding proportional output pressure for the control of the valve device from the braking power generator.

2. Electropneumatic brake system according to claim 1, wherein the valve device includes a relay valve for admitting pressure to brake cylinders of a rear vehicle axle; and the pressure modulator for modulating a proportional output pressure includes a proportional valve electrically controlled by the electronic control unit to provide the proportional output pressure and a reversing valve which, when the electronic control unit fails, provides the proportional output pressure from the braking power generator to the relay valve.

3. Electropneumatic brake system according to claim 2 wherein the proportional valve and the reversing valve are controlled by the electronic control unit.

4. Electropneumatic brake system according to claim 1, wherein the valve device includes a trailer control valve having dual control circuits; and the pressure modulator for modulating a proportional output pressure includes a proportional valve electrically controlled by the electronic control unit to provide the proportional output pressure and a reversing valve which, when the electronic control unit fails, provides the proportional output pressure from the braking power generator to the trailer control valve such that at least one of the control circuits of the trailer control valve can be controlled pneumatically.

5. Electropneumatic brake system according to claim 4 wherein the proportional valve and the reversing valve are controlled by the electronic control unit.

6. Electropneumatic brake system according to claim 1 wherein the electronic control unit receives input signals from sensors which sense one of rotational speed, wear, load, a coupling force, or pressure the signals of the sensors are used by the electronic control unit to determine the electric control signals for the pressure modulator.

7. Electropneumatic brake system according to claim 6, wherein in the case of the use of an antilock system, pressure control valves of a brake cylinder of a rear axle fed by the valve device are arranged behind the valve device.

8. Electropneumatic brake system according to claim 1 wherein in the case of the use of a wheel slip control system, a pressure switch, for deactivating the wheel slip control system below a predetermined pressure level, is connected to a pressure medium supply for the pressure modulator and is in an operative connection with the electronic control unit.

9. Electropneumatic brake system according to claim 1 wherein a brake system of a front axle of the vehicle is in the pressure medium circuit only and operates pneumatically.

10. Electropneumatic brake system according to claim 1, including a second pressure modulator and each pressure modulator controlling a respective valve device and said pressure modulators are in a single pressure medium circuit with said braking power generator.

11. Electropneumatic brake system according to claim 1 wherein said braking power generator includes two pressure medium circuits; and including a second pressure modulator, each pressure modulator being in a separate pressure medium circuit with said braking power generator.

* * * * *